3,583,893
PRODUCTION OF INTERFERON INDUCERS
Barbara D. Lago, Westfield, N.J., assignor to Merck & Co., Inc., Rahway, N.J.
No Drawing. Filed July 15, 1968, Ser. No. 744,687
Int. Cl. C12d *13/06*
U.S. Cl. 195—28                                4 Claims

ABSTRACT OF THE DISCLOSURE

Double-stranded ribonucleic acid is produced by growing *E. Coli* in a corn steep liquor medium and then infecting the *E. coli* with a mutant of MS2 coliphage.

---

This invention relates to the production of interferon inducers and particularly to a process for producing the inducers and recovering them in a high percentage yield and purity.

It has been known for three decades that infection with one virus may limit or exclude infection with a second and unrelated virus. This is called the interference phenomenon. Considerable interest in interference was aroused in 1957 when Isaacs and Lindenmann showed that interference was mediated by a protein of small molecular weight, called interferon, which was produced by virus-infected cells and which protected new and uninfected cells from virus infection.

It was hoped at that time that interferon might be produced in cells, purified, and used to prevent or to treat viral diseases. There was great hope for the substance since it is broad-spectrum and active against essentially all viruses. The substance itself is species-specific with respect to its utilization, e.g., interferon for human use would have to be prepared in human cells. Though active to some degree in experimental tests, interferon never achieved practical importance because of the lack of a satisfactory source and because the cost for producing such material would be prohibitive.

The alternate approach lay in stimulating the body, particularly of humans, to prepare and distribute its own interferon using some safe and effective inducing substance. Many kinds of substances including bacteria, viruses, polysaccharides, mitogenic agents, endotoxin and the like stimulate interferon formation but none gives promise for routine use because of toxicity, antigenicity, infectiousness and the like.

Studies have been reported in an article entitled, "Inducers of Interferon and Host Resistance, I. Double Stranded RNA from Extracts of Penicillium Funiculosum," by G. P. Lampson et al., in the Proceedings of the National Academy of Sciences, vol. 58, No. 2, pp. 782–789 (August 1967), and which were directed toward finding the natural stimulus for interferon induction by molds in the hope that a suitable and practicable inducing chemical might be found. It was discovered in that work that double-stranded but not single-stranded ribonucleic acid was highly active in microgram amounts in inducting interferon and host resistance in animals and in cells in culture. Double-strandedness is a necessary requirement for multiplication of ribonucleic acid-type viruses. Such nucleic acid is not normal to cells and it was reported in the fourth one of the series of articles namely, IV. Double-stranded Replicative Form RNA (MS2–RF–RNA) from *E. coli* infected with MS2-coliphage, by A. K. Field et al. in the same journal at pp. 2102–2108, vol. 58, No. 5 (November 1967) that MS2 coliphage when grown in *E. coli* cells produced a double-stranded RNA which proved to be an excellent inducer of interferon when administered to animals.

In accordance with the present invention it has been found that two factors conjointly contribute to an exceptionally large production of a double-stranded RNA obtained from *E. coli* infected with MS2 coliphage. These two factors are first, the presence of corn steep liquor in the culture medium in which the *E. coli* are growing and second, the infection of the growing *E. coli* with a mutant of MS2 coliphage, MU–9.

The corn steep liquor is a commercial product and is available from a number of sources. The general characteristics of corn steep liquor are defined on page 287 of the seventh edition of the Merck Index. It has been used in practicing this invention as a culture medium for the growth of *E. coli* in aqueous solution at concentrations, v./v. between 5 and 15%, but concentrations from 2.5 to 20% may be used. Maximum production of double-stranded RNA was observed with concentrations between 8 and 9%, v./v.

The MU–9 mutant of MS2 coliphage has been described by Drs. C. Weissman and S. Ochoa in an article entitled "Replication of Phage RNA," which appeared in "Progress in Nucleic Acid Research and Molecular Biology," vol. 6, pp. 353–399 (March 1967). Seed samples were obtained from them at the New York City University School of Medicine.

As is pointed out above, a feature of this invention is that it has been found that a large amount of double-stranded ribonucleic acid (hereinafter termed DS–RNA) is produced if *E. coli* cells are grown in a dilute corn steep liquor culture medium and infected with the MU–9 mutant of MS2 coliphage. This may be explained by the fact that the corn steep liquor allows more rapid growth of the *E. coli* cells to a gretater population density. Production of virus and of double-stranded DS–RNA requires cells that are metabolically highly active (in the logarithmic phase of growth). When cells are grown on the tryptone medium routinely used in most laboratories and these cells are used for the propagation of MS2, production of the coliphage and of DS–RNA per unit medium volume is greatest when cultures are infected at cell density of $5 \times 10^8$/ml. Productivity declines at higher cell densities. The productivity per cell present at the time of infection is optimal at cell densities lower than $5 \times 10^8$ ml., but the reduced cell concentration results in a net product decrease.

The use of corn-steep liquor as culture medium supports growth of *E. coli* cells to much higher final densities and allows productive infection at cell concentration higher than $5 \times 10^8$ ml. An 8-fold increase over the amount of DS–RNA produced in tryptone medium has been attained by use of corn-steep liquor culture media. Data demonstrating the growth and productivity of *E. coli*

3000 (HFR) grown on corn-steep liquor media are summarized in Table I.

TABLE I
Growth of *E. coli* 3000 on corn-steep liquor

| Experiment | Dry weight (g./liter) | | | | |
|---|---|---|---|---|---|
| | 1[1] | 2[1] | 3[1] | 4[2] | 5[2] |
| Medium: | | | | | |
| Corn-steep liquor, percent (v./v.): | | | | | |
| 5.0 | 3.9 | 3.6 | 3.6 | 4.4 | 7.2 |
| 7.5 | | | | 6.6 | 10.7 |
| 10.0 | | | | 7.8 | 11.7 |
| 15.0 | | | | | 7.6 |
| Tryptone medium | 1.5 | 1.1 | 1.1 | | |
| Inoculum | 0.1 g./liter stationary phase cells | | | 0.2 g./liter log phase cells | |

[1] 24 hours.
[2] 10 hours.

Table I shows that in twenty-four hours after inoculation, a corn-steep liquor medium results in about twice the growth that is obtained in tryptone medium. Moreover, the use of corn-steep liquor with a 0.2 g./liter log phase innoculum results after ten hours incubation in about a two-fold increase of cell growth, as compared with that obtained after twenty four hours incubation with a 0.1 g./liter stationary phase innoculum.

Table II compares the production of DS-RNA in the two media; *E. coli* 3000 cells, grown both in corn-steep liquor medium and in tryptone medium, were infected with the MU-9 mutant. It shows that the presence of 8.5% of corn-steep liquor in the culture medium resulted in a 3 to 5 times increase in the yield of DS-RNA compared to the yield when the corn-steep liquor is omitted.

TABLE II.—PRODUCTION OF SD-RNA IN CORN-STEEP MEDIUM[1]

I. Ratio medium volume to flask volume =0.2; non-baffled flasks

| Medium | Experiment | Cells/ml. at infection (No./ml.) | Mg. DS-RNA/ liter |
|---|---|---|---|
| Tryptone corn-steep, 5% | 1 | 5.00×10⁸ | 35 |
| | 2 | 5.20×10⁸ | 55 |
| | 2 | 9.50×10⁸ | 54 |
| | 2 | 2.25×10⁸ | 75 |
| | 2 | 2.90×10⁹ | 64 |

II. Ratio medium volume to flask volume =0.08; baffled flasks[2]

| Medium | Experiment | Cells/ml. at infection (No./ml.) | Mg. DS-RNA/ liter |
|---|---|---|---|
| Corn-steep, 5% | 1 | 7.30×10⁸ | 43 |
| | 1 | 7.70×10⁸ | 49 |
| | 1 | 1.10×10⁹ | 74 |
| | 1 | 1.19×10⁹ | 76 |
| | 1 | 2.00×10⁹ | 102 |
| | 1 | 2.02×10⁹ | 99 |
| | 2 | 2.08×10⁹ | 106 |
| | 2 | 3.24×10⁹ | 218 |
| | 3 | 3.60×10⁹ | 154 |
| | 1 | 3.96×10⁹ | 176 |
| | 3 | 4.10×10⁹ | 152 |
| | 1 | 4.24×10⁹ | 152 |
| | 1 | 7.40×10⁹ | 63 |
| | 1 | 7.40×10⁹ | 66 |
| | 4 | 8.08×10⁹ | 93 |
| | 4 | 9.10×10⁹ | 93 |
| | 3 | 9.76×10⁹ | 193 |
| | 3 | 1.14×10¹⁰ | 256 |
| Corn-steep, 6% | 4 | 8.32×10⁹ | 153 |
| | 4 | 9.30×10⁹ | 105 |
| Corn-steep, 7% | 4 | 8.00×10⁹ | 219 |
| | 4 | 9.00×10⁹ | 218 |
| Corn-steep, 7.5% | 3 | 3.00×10⁹ | 63 |
| | 3 | 9.60×10⁹ | 246 |
| Corn-steep, 8% | 4 | 8.00×10⁹ | 285 |
| | 4 | 9.00×10⁹ | 235 |
| Corn-steep, 8.5% | 5 | 5.40×10⁹ | 210 |
| | 5 | 6.00×10⁹ | 220 |
| | 5 | 7.90×10⁹ | 275 |
| | 5 | 8.20×10⁹ | 287 |
| | 5 | 1.15×10¹⁰ | 191 |
| | 5 | 1.15×10¹⁰ | 226 |
| | 5 | 1.40×10¹⁰ | 32 |
| | 5 | 1.50×10¹⁰ | 22 |
| Corn-steep, 9% | 4 | 7.12×10⁹ | 277 |
| | 4 | 8.40×10⁹ | 278 |
| Corn-steep, 10% | 3 | 3.68×10⁹ | 28 |
| | 2 | 4.16×10⁹ | 225 |
| | 2 | 5.60×10⁹ | 222 |
| | 3 | 7.04×10⁹ | 104 |
| Corn-steep, 15% | 2 | 4.04×10⁹ | 16 |
| | 3 | 5.60×10⁹ | 8 |
| | 3 | 6.56×10⁹ | 149 |
| | 3 | 6.96×10⁹ | 11 |
| | 3 | 9.10×10⁹ | 21 |

[1] Corn-steep liquor concentration is expressed as percent (v./v.); cell concentration calculated from optical density.
[2] The baffles in these flasks were vertical fins of the commercially available type.

Only certain strains of *E. coli* can be used as hosts for the growth of the MU-9 mutant and others for the production of DS-RNA. The invention, therefore, consists of two stages: accumulation of adequate numbers of MU-9 coliphage by growth in a permissive (suppressor-containing, i.e., one permitting the development of the entire coliphage strain) of *E. coli* (e.g. K-90), followed by infection of a restrictive or non-permissive strain (e.g. 3000). These latter strains do not contain suppressors that modify the protein synthesizing machinery so that nonsense coding triplets in the mutant RNA (those not corresponding to a transfer RNA for an amino acid) can be mistranslated and thereby lead to insertion of an amino acid into a growing polypeptide chain. Formation of entire coliphage is precluded in these strains and elevated levels of double-stranded RNA thereby accumulate. These strains of *E. coli* are obtainable from the American Type Culture Collection. To carry out this two state process the MU-9 mutant is first added to *E. coli* K-90 in the corn-steep liquor culture medium. The *E. coli* is incubated until lysis occurs, which will require 3 to 4 hours. The coliphage released from the *E. coli* K-90 is then used to infect *E. coli* 3000 in a fresh corn steep-liquor culture medium.

Uncontrolled serial propagation of MU-9 in the permissive host (K-90) may lead to accumulation of reverse mutations to the parental MS-2 type, presumably due to greater reproductive efficiency of the parental type. The conditions required for production of MU-9 lysates in corn steep medium have been determined and it appears that agitation and aeration sufficient to permit a generation time of 30 to 40 minutes (accomplished by use of a medium volume no greater than 1/10 of the flask volume) as well as the use of an MU-9 lysate of *E. coli* K-90 that contains less than 0.08% MS2 appear to be essential. The amount of lysate added should introduce 20 virus for each cell present at the time of addition. Increasing the corn-steep concentration from 5% to 8.5% may also contribute significantly to the maintenance of low reversion frequencies.

In order to obtain immediate and continued rapid growth, the corn-steep medium must be inoculated with cultures that are in the logarithmic phase of growth. A stationary phase inoculum will double and then cease multiplication for approximately four to six hours. The final increase in growth of a stationary phase inoculum as shown by an increase in optimal density after inoculation is usually 25 to 30 percent lower than when log phase growth cells are used.

Experiments relating to the effects of aeration rate and multiplicity of infection (virus/cell) on the fraction of HS2 (revertants) in corn-steep lysates are summarized in Table III.

TABLE III

| Experiment Number | Type of 250 ml. flask | Medium quantity (ml.) | Type [1] | Cells/ml. at infection (No./ml.) | Multiplicity of infection | Percent MS-2 in infecting lysate | Virus produced Total | Percent MS-2 |
|---|---|---|---|---|---|---|---|---|
| 1 | Non-baffled | 50 | CS-5% | 6.20×10$^8$ | 4 | .08 | 4.5×10$^{11}$ | 0.31 |
| | | | | 9.70×10$^8$ | 5 | | 1.2×10$^{12}$ | 0.27 |
| | | | | 2.04×10$^9$ | 5 | | 8.0×10$^{11}$ | 0.71 |
| 2 | Baffled | 50 | CS-5% | 1.34×10$^9$ | 11 | .05 | 7.8×10$^{11}$ | 0.83 |
| | | | | | | | 8.4×10$^{11}$ | 0.42 |
| | | | | | | | 8.9×10$^{11}$ | 0.80 |
| | do | 20 | CS-5% | 1.08×10$^9$ | 9 | .05 | 7.6×10$^{11}$ | 0.22 |
| | | | | | | | 9.6×10$^{11}$ | 0.14 |
| | | | | | | | 8.6×10$^{11}$ | 0.31 |
| 3 | Baffled | 20 | CS-8.5% | 5.00×10$^8$ | 23 | .06 | 6.1×10$^{11}$ | .08 |
| | | | CS-8.5% | 3.75×10$^9$ | 23 | | 1.3×10$^{12}$ | .09 |
| | | | T | 6.60×10$^8$ | 21 | | 9.4×10$^{11}$ | .08 |

[1] CS=corn-steep liquor (%=v./v.); T=tryptone medium.

The experiments of Table III show that the conditions of experiment 3, which involved a high aeration rate and relatively more MU-9 mutant with respect to the E. coli cells, resulted in an increased virus yield and a minimal reversion to the parental, MS-2, form.

Representative examples of the invention are the following:

The corn-steep liquor medium was prepared by dissolving 60 grams NaOH pellets in 1 liter water, adding 1 liter of well mixed fresh corn steep liquor (50% solids) and stirring for 15 minutes; the pH should be adjusted to 7.0 if it differs from this. This mixture was centrifuged cold but it can also be filtered by a filter aid procedure in order to remove solids. This 50% (v./v.) stock solution is diluted with distilled water in order to obtain the final desired concentration and brought to a boil or autoclaved briefly, allowed to cool and contrifuged (or filtered) in order to remove all sediment. Depending upon extent of dilution, the final medium will contain between 5 and 15% (v./v.) corn-steep liquor, or 2.5 and 7.5% corn-steep solids, respectively.

Sufficient log phase E. coli strain K-90 is added to 20 ml. of this mixture in a 250 ml. baffled flask so that 2×10$^8$ cells/cc. will be present. Incubation at 37° C. is permitted to occur for 2½ hours and during this time the flask is shaken. An assay showed that growth had occurred to 3.8×10$^9$ cells/cc. 3.7 cc. of an MU-9 lysate containing a total of 1.7×10$^{12}$ coliphage, of which only .06% were MS2 was then added to the E. coli and growth was permitted to occur at 37° C. for 4 hours. At the end of this time the lysate was cooled. This lysate contained 1.3×10$^{12}$ total phage/cc., of which .09% were MS2. If a lysate is to be stored for prolonged periods, chloroform is added to a final concentration of 1% (v./v.). If desired, the cells can be separated from the coliphage by centrifugation. Production of double-stranded RNA is initiated in an E. coli 3000 culture that has been grown after inoculation with a log phase culture at 37° C. for 3 hours in corn-steep medium. During this time the E. coli 3000 will increase from 4×10$^8$/cc. to 8×10$^9$/cc. Sufficient MU-9 lysate of E. coli K-90 is now added in order to introduce more than 6 bacteriophage/cells. Incubation of these E. coli 3000 cells is permitted to occur after infection for 3 hours at 37° C.

The DS-RNA is recovered by the process described in the article IV mentioned above. It is used as an interferon inducer in humans, for example, by spraying it in the nose during the common cold season. A suitable preparation is made by adding the DS-RNA to water to make a sprayable preparation to be put in an ordinary aspirator spray. The concentration should be such that one or two sprays delivers from 1 to 100 mg. but more likely 5 to 10 mg. of the purified DS-RNA to the nasal and oral membranes. This would be done once every 2 to 3 days.

Other examples of the invention are apparent from the above. For instance, other nutrient material commonly present in culture medium may be added to the dilute aqueous corn-steep liquor used in this invention. The incubation after the addition of the coliphage may be for as short a period as about one hour but this will be wasteful of the E. coli and the incubation may be extended beyond 3 hours but with a diminishing rate of production of the DS-RNA. Also fewer than 6 coliphage/cell may be added but with less efficient production of DS-RNA and more than 24 coliphage/cell is wasteful.

Other examples of the invention involve the omission of the preliminary growth of the MU-9 mutant in a permissive strain of E. coli; in this case the MU-9 mutant seed is initially added to the non-permissive strain of E. coli, but relatively decreased yields of DS-RNA can be expected. Other known permissive and other non-permissive strains of E. coli can be substituted for the specific ones in the example above.

What is claimed is:

1. The process for producing double-stranded ribonucleic acid which comprises growing a non-permissive strain of E. coli in a dilute aqueous corn-steep liquor culture medium containing about 5% to about 15% of corn steep liquor by volume, and then infecting the resulting E. coli with a mutant of MS2 coliphage, MU-9, which has been grown in a permissive strain of E. coli.

2. The process of claim 1 in which the coliphage is added to the E. coli in the logarithmic phase of the latter growth.

3. The process of claim 1 in which the coliphage is added to the E. coli when the latter reaches a population density greater than 5×10$^8$ cells/ml.

4. The process of claim 1 in which the infection proceeds for about 3 hours.

References Cited

Davidson et al., Progress in Nucleic Acid Research and Molecular Biology, vol. 6, pp. 377-381 (1967).

Field et al., National Academy of Sciences, vol. 58, No. 5, November 1967, pp. 2102-2108.

ALVIN E. TANENHOLTZ, Primary Examiner

U.S. Cl. X.R.

195—1.5, 100